United States Patent [19]

King

[11] 4,402,191

[45] Sep. 6, 1983

[54] EVAPORATOR SECTION FOR CONTAINER REFRIGERATION UNIT

[75] Inventor: Donald D. King, Chanhassen, Minn.

[73] Assignee: Thermo King Corporation, Minneapolis, Minn.

[21] Appl. No.: 337,181

[22] Filed: Jan. 5, 1982

[51] Int. Cl.³ .............................................. B60H 3/04
[52] U.S. Cl. ..................................... 62/239; 62/263; 62/448
[58] Field of Search ......................... 62/448, 239, 263

[56] References Cited

U.S. PATENT DOCUMENTS

| | | | |
|---|---|---|---|
| Re. 21,298 | 12/1939 | Nelson | 62/263 |
| 2,175,946 | 10/1939 | Smith | 62/263 X |
| 3,308,634 | 3/1967 | Smith | 62/263 |
| 3,831,395 | 8/1974 | Levy | 62/263 |
| 3,871,188 | 3/1975 | Vold et al. | 62/263 X |
| 4,257,240 | 3/1981 | Christiansen et al. | 62/239 X |

Primary Examiner—Lloyd L. King
Attorney, Agent, or Firm—E. C. Arenz

[57] ABSTRACT

A container refrigeration unit provided with an upper evaporator section 24 has centrifugal fans 48 supported on an open work frame 54 and adapted to be in one position or rotated 90° therefrom to another position, for obtaining either a top discharge operation with draw-through of air through the evaporator 50 or, alternatively, a bottom discharge operation with blow through of air through the evaporator. Air flow blocking plate means is in the form of plate 98 or rear access panel.

6 Claims, 11 Drawing Figures

EVAPORATOR SECTION FOR CONTAINER REFRIGERATION UNIT

CROSS REFERENCE TO RELATED APPLICATION

U.S. patent application Ser. No. 337,060 filed Jan. 5, 1982 is a related patent application in the sense that at least a portion of the disclosure therein is directed to the same device as that in which this invention is incorporated.

BACKGROUND OF THE INVENTION

The invention pertains generally to the art of container refrigeration units and particularly to an evaporator section arrangement which facilitates the provision of reversal of direction of evaporator air flow between a draw-through mode for top discharge and, alternatively, a blow-through mode for bottom discharge. This is embodied in an overall evaporator section arrangement in which access to accomplish the reversal is promoted as well as access to various refrigeration elements associated with the evaporator coil.

SUMMARY OF THE INVENTION

In accordance with the invention the evaporator section is provided with a generally open horizontal frame which supports electric motor means and centrifugal fan means driven thereby with the fan means comprising wheel means supported by motor shaft means and scroll means having discharge opening means. Means are provided for positioning the scroll means in a disposition with the discharge opening means in a vertical plane for operation in a draw-through mode, and in a horizontal plane for operation in a blow-through mode, with planar plate means being provided having opening means therein located to register with the scroll discharge opening means and with the remainder of the plate means adapted to block air flow through the plane adjacent the opening means. Also, motor mount bracket means are carried by the frame and means are provided securing the motor means to the motor mount means in a fashion to permit shifting of the motor means and wheel means to separate positions in accordance with the positioning of the scroll means in one or the other of the two positions.

As may be stated in other words, in essence the scroll housings for the centrifugal fans are adapted to be rotated 90° between one position and another position, and means are provided to adapt positioning of the motors to both of the positions as well as to provide for recircuiting of the air flow to the fans.

DRAWING DESCRIPTION

DESCRIPTION OF THE PREFERRED EMBODIMENT

Figure 2:
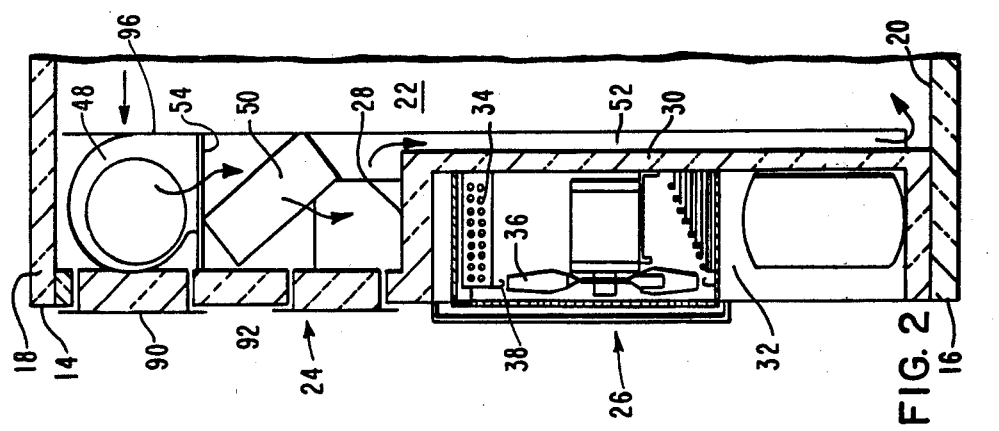
FIG. 2 is a generally schematic outline view in the nature of a vertical section of an arrangement according to the invention.
Figure 1:
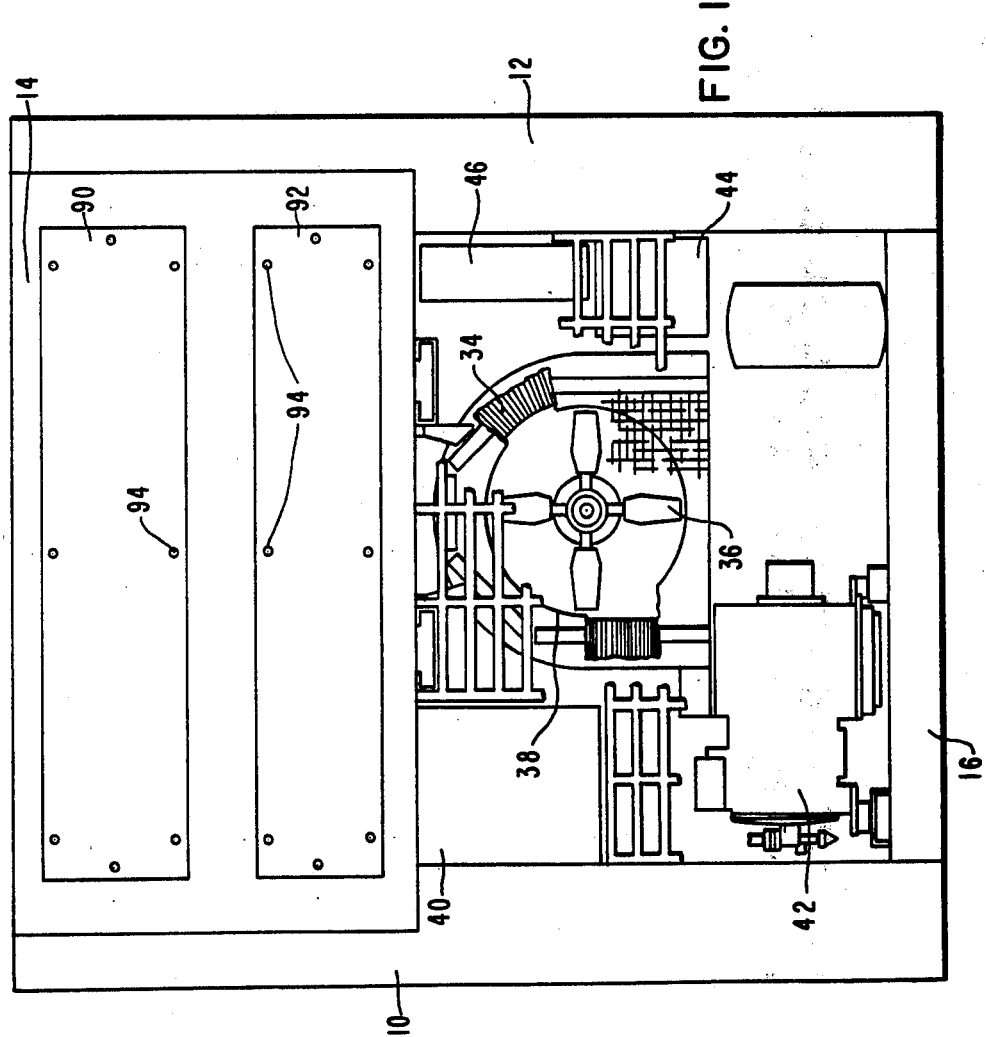
FIG. 1 is a partly broken face view of a container refrigeration unit of the type to which the invention is applied.

The container unit of FIGS. 1 and 2 has a front face provided with opposite side flanges 10 and 12, and top and bottom flanges 14 and 16 which abut the margins defining the front opening in a container unit having top and bottom walls 18 and 20 (FIG. 2) with the refrigeration unit being operated to serve the space 22 inside the container.

The refrigeration unit has two main sections, the upper evaporator section generally designated 24 and the lower condenser section generally designated 26. The sections are thermally insulated from each other as by the horizontal thermal wall 28 between the top of the condenser section and the bottom of the evaporator section, and the vertical thermal wall 30 at the rear wall of the condenser section.

The component arrangement of the condenser section is the subject of the noted cross reference patent application. As such, it will only be briefly detailed herein. The condenser section is basically in the form of a forwardly-open pocket generally designated 32. It contains a refrigerant condenser coil 34 having a general U-shape and located in the upper, generally central portion of the pocket in an inverted disposition. A propeller fan 36 in the open fan ring 38 draws air through the condenser at the sides and top, and discharges it forwardly.

Other components in the pocket, and arrayed to the sides and bottom of the coil, are the control box 40, electric motor compressor 42, operations recorder 44 and main power transformer 46.

Turning now to the matters with which this particular invention is concerned, specifically the evaporator section arrangement, in FIG. 2 one alternative air flow arrangement is shown in which the air is drawn from the container via centrifugal fans 48, is discharged downwardly through the evaporator 50, with the flow then being drawn through a narrow passage 52 behind the condenser section, as well as along both of the opposite sides of the condenser section through passages which are not shown in the Figures. In the FIG. 2 arrangement the air flow mode is that of blow-through, with bottom discharge into the container. The general direction of the flow is as indicated by the dash line arrows.

In an alternative air flow arrangement according to the invention, the fan housing means generally indicated 48 are rotated counterclockwise 90° from the FIG. 2 disposition, one blocking plate which will be described hereinafter is removed and the air flow is converted to a draw-through mode with top discharge. The direction of air flow in this alternative mode is opposite to that of the dash line arrows.

Figure 4:
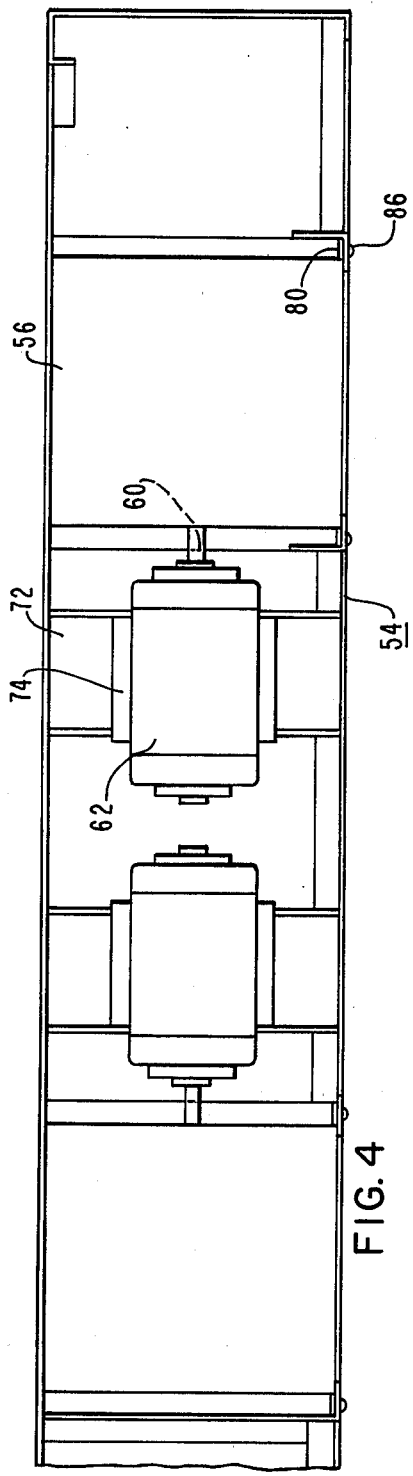
FIG. 4 is a top view of one half of the arrangement of FIG. 3.
Figure 3:
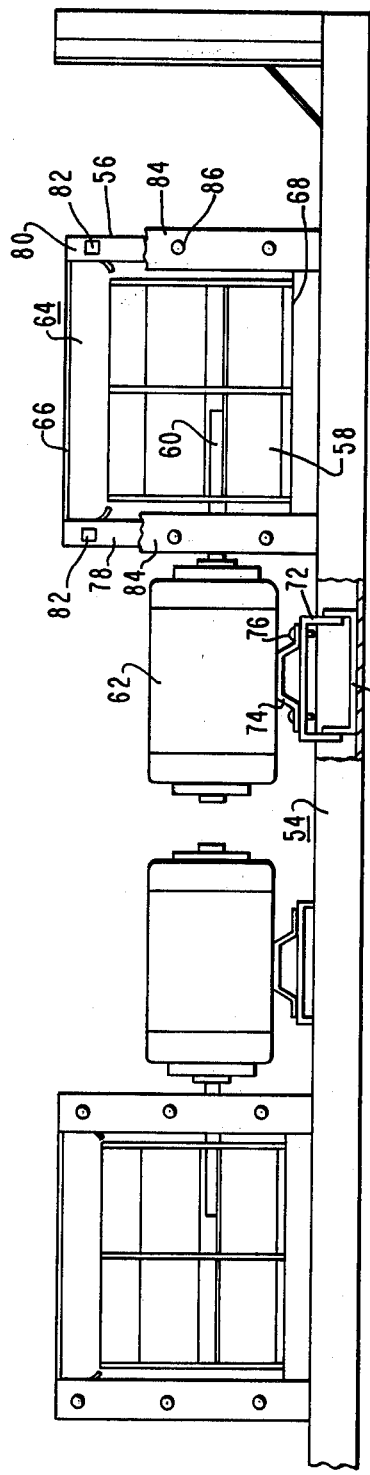
FIG. 3 is a partly-broken elevation view of the frame and fan assembly in in a draw-through disposition and in removed relation from the unit.

Details of the construction arrangement to obtain the top discharge and draw-through operation are perhaps best seen in FIGS. 3 and 4. A generally open, horizontal frame 54 extends from side-to-side and front-to-rear in the evaporator section. In the currently preferred form the centrifugal fan means comprise two separate fan and motor assemblies in mirror image relation. Each of the centrifugal fans includes a scroll-shaped housing 56 containing a centrigual fan wheel 58 supported by motor shaft 60 from the electric motor 62. The scroll shaped housings have discharge openings 64 which, as seen in FIG. 3, are bounded at the top by the edge of the circumferential sheet 66 of the scroll and at the bottom by the cutoff 68 of the scroll.

The motor 62 is supported from the frame by motor mount bracket means which includes the upwardly-open channel 70 extending between the front and rear legs of the frame 54, the downwardly-open channel 72 secured thereto, and the motor base 74 which is attached to the channels 72 with fasteners such as bolts 76. The holes in the channels 72 through which the bolts 76 extend are slotted in a front-to-rear direction to permit the motor to be shifted to a limited degree forwardly or rearwardly in accordance with the mode of operation which the unit is to have.

The lefthand fan and motor assembly in FIG. 3 is in mirror image relation to the righthand one, contains the same parts and arrangements and accordingly is not provided with numerals.

The top view of the righthand motor and fan arrangement of the frame is illustrated in FIG. 4 with the identical numerals indicating the parts identical to those of FIG. 3. The top discharge arrangement results in the scroll discharge opening in FIG. 4 facing the bottom of the paper as seen by the viewer.

Figure 6:
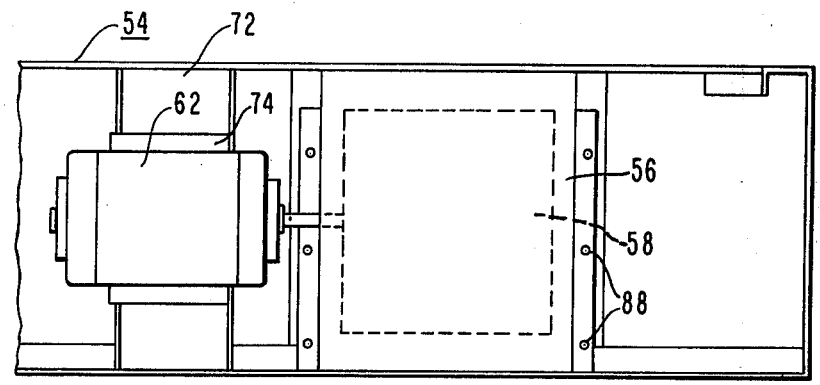
FIG. 6 is a top view of the assembly of FIG. 5.
Figure 5:
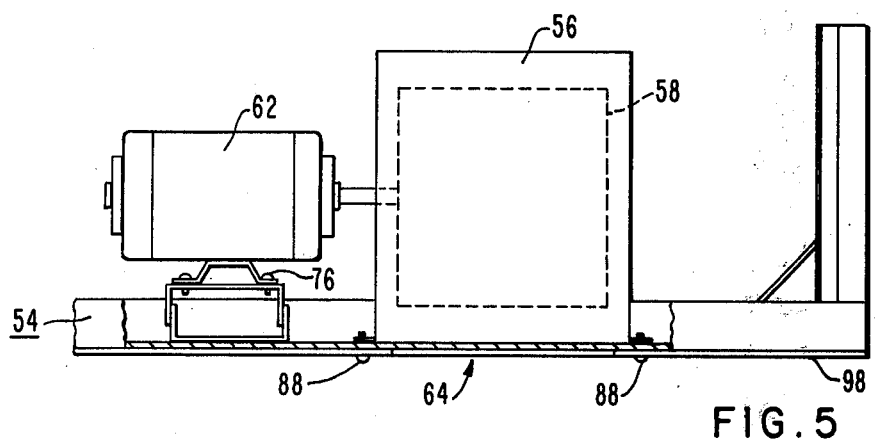
FIG. 5 is a partly broken elevation view of one half of the frame and fan assembly in a blow-through disposition.

In FIGS. 5 and 6 the fans are shown in their positions in which they have been rotated 90° from that of FIGS. 3 and 4 so that the discharge openings of the scrolls are facing downwardly for a blow-through and bottom discharge mode of operation. Again, identical numerals are provided for identical parts seen in the other views.

The discharge openings 64 are bounded at their opposite sides by outwardly extending flanges 78 and 80 (FIG. 3) provided with a series of openings 82 into which are received captive nuts. When the fans are disposed for the draw-through mode for top discharge, bracket means 84 carried from the frame 54 support the scroll housings in the draw-through disposition through fasteners such as bolts 86 which are turned into the captive nuts. When the scroll housings are to be disposed in a blow-through, bottom discharge position, the brackets 84 are omitted or removed, and the scroll housings are turned to the bottom discharge dispositions as shown in FIGS. 5 and 6, and bolts 88 are turned up through openings in a front-to-rear extending frame member into the same captive nuts. To accomplish the change in disposition of the scroll housings, it is usually preferable to loosen the motor mount bolts 76 to permit the motor 62 to be shifted during the rotation of the housing, and then resecured in the new position after the scroll housing has been rotated.

Referring briefly to FIG. 1 again, it will be seen that at the front of the evaporator section an upper access panel 90 and a lower access panel 92 are provided, these panels being removably secured by a plurality of fasteners 94.

Figure 7:
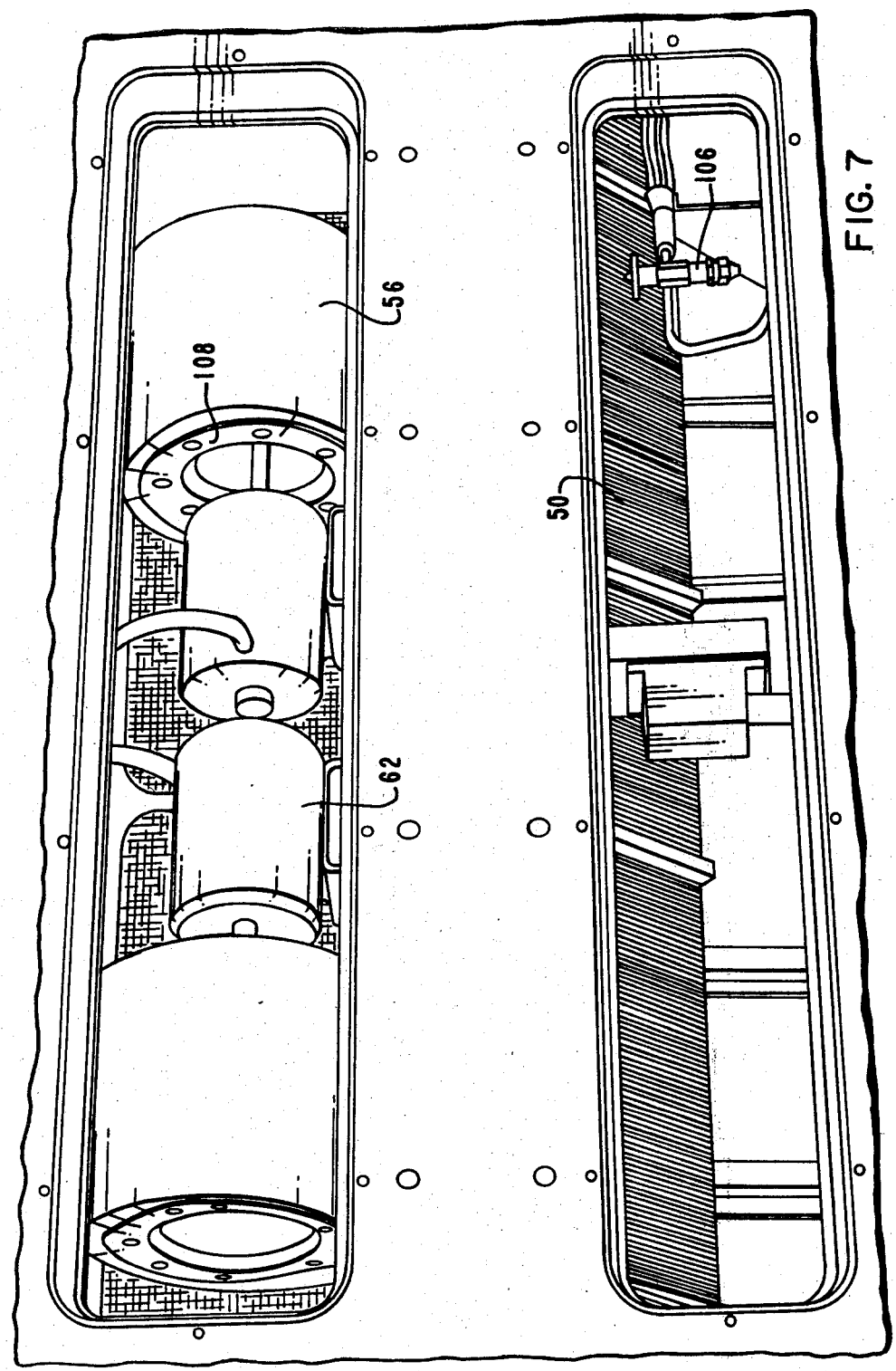
FIG. 7 is a somewhat perspective view of the evaporator portion of the unit, and with the front access panels removed.
Figure 8:
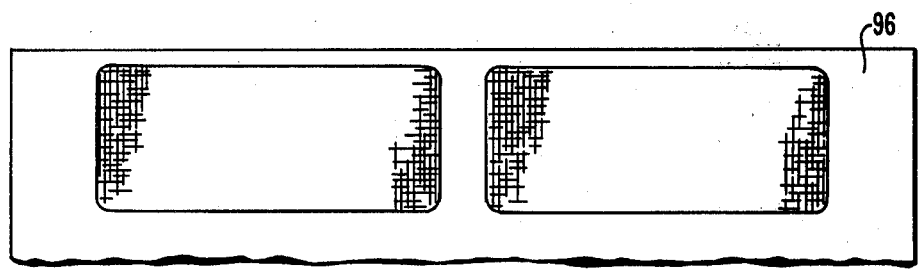
FIG. 8 is an elevation view of the upper portion of the back side of the unit with an upper access panel for a blow-through mode in place.

In FIG. 7 the upper portion of the unit is shown with the panels removed and the fan and motor assemblies and the evaporator coil 50 are all clearly seen. To rotate the scrolls the upper panel 90 must be removed to provide sufficient clearance to permit the rotation. Also, and now referring to FIG. 8, one upper panel 96 on the rear face of the unit, and which would be a panel one would see standing inside the container and looking at the unit, must be removed to permit the rotation, as well as to permit the insertion of a first planar blocking plate which is used to provide the correct air flow circuiting when the scroll housings are in the bottom discharge, blow-through disposition.

Figure 9:
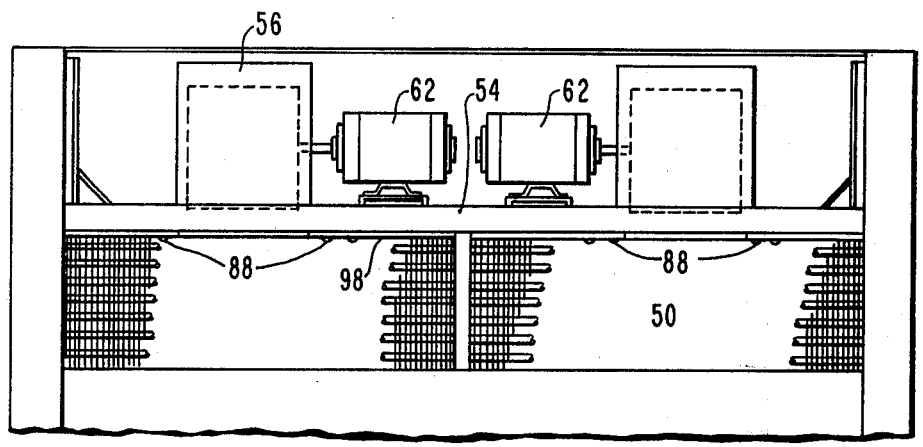
FIG. 9 is a view similar to FIG. 8 with the access panel removed.
Figure 10:
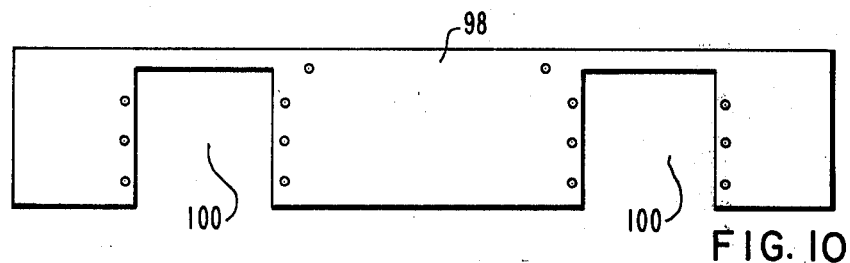
FIG. 10 is a face view of the blocking plate which is secured to the frame to provide for a blow-through mode of operation for bottom discharge.

In FIG. 9 the view with this panel 96 removed is shown. The first blocking plate 98 (FIG. 10) is provided with scroll discharge opening means 100 which are located to register with the discharge openings of the scrolls when the scrolls are in their blow-through disposition. This blocking plate 98 is inserted into the evaporator section below the horizontal frame, and is fastened to the bottom side of the frame and to the flanges 78 and 80 of the scrolls with the bolts 88, which are also seen in FIG. 5 along with the blocking plate 98.

Figure 11:
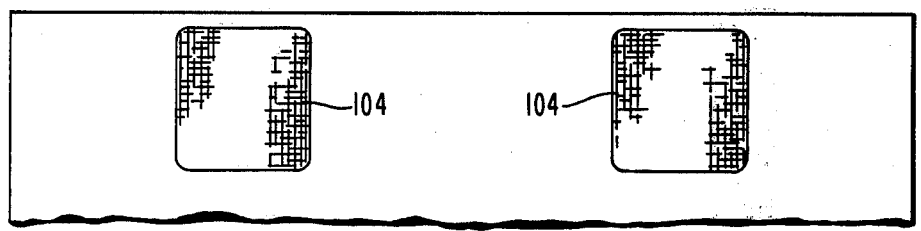
FIG. 11 is an elevation view similar to FIG. 8 with a different upper access panel for a draw-through mode in place.

When the fans are in their draw-through mode with the discharge openings in the vertical plane as in FIGS. 3 and 4, short circuiting of the evaporator air flow is preventing by the provision of second blocking plate means, which takes the form of the different upper, rear access panel 102 (FIG. 11) in which the grille openings 104 are sized to correspond with the fan discharge openings.

Referring back to FIG. 7 it will be seen that below the bottom face of the evaporator coil there is an expansion valve 106 for the evaporator coil. Additionally located in this space are the coil heaters and drain pan heaters. With this arrangement of the upper and lower access doors, any of these elements may be replaced or repaired through the lower access door without requiring removal of the refrigeration unit from the container. That is required only if the evaporator coil 50 itself must be replaced.

Correspondingly, since both the scroll housings and the fan motors are not permanently fixed in their positions in the space behind the upper access panel 90, removal of that access panel permits repair of the motors and wheels from the front face of the unit if necessary. Replacement of the wheels may be accomplished by loosening all of the components of the fan and motor assemblies, and removing the inboard inlet end plate 108 (of FIG. 7) of the scroll housing from the main part of the scroll.

I claim:

1. In a transport refrigeration unit having an upper evaporator section with upper fan means and a lower evaporator coil therein, and a lower condenser section thermally insulated from the evaporator section, an arrangement permitting the provision of reversal of direction of evaporator air flow between a draw-through mode for top discharge and, alternatively, a blow-through mode for bottom discharge, comprising:

a generally open, horizontal frame supporting electric motor means and centrifugal fan means driven thereby, said fan means comprising wheel means supported by motor shaft means, and scroll means having discharge opening means;

motor mount bracket means carried by said frame;
means for positioning said scrolls in a disposition with said discharge opening means in a vertical plane for operation in a draw-through mode, and in a horizontal plane for operation in a blow-through mode;
planar plate means having opening means therein located to register with said scroll discharge opening means, with the remainder of said plate means adapted to block air flow through the plane of the plate adjacent said opening means;
means securing said motor means to said motor mount means in a fashion to permit shifting said motor means and wheel means to separate positions in accordance with positioning of said scroll means in one or the other of the two positions.

2. In a unit according to claim 1 wherein:
said electric motor means and centrifugal fan means comprise first and second motors and fans arranged in mirror image relationship with each other with said motors being inboard of said fans.

3. In a unit according to claim 1 wherein:
said means for positioning said scroll for operation in a draw-through mode includes removable scroll support bracket means detachably connected to said frame and to said scrolls.

4. In a unit according to claim 1 wherein:
said planar plate means comprises one plate adapted to be secured to said frame for operation of said unit in a blow-through mode;
and a second plate forming a part of the rear face of said unit for operation of said unit in a draw-through mode.

5. In a unit according to claim 1 wherein:
said unit includes a front face overlying said evaporator section, said front face including means defining an upper access opening generally registering with the fan and motor means, and a separate lower access opening generally registering with the space below said evaporator.

6. In a unit according to claim 5 wherein:
said scroll means includes a circumferential portion in scroll form and inlet end plate means removably attached thereto.

* * * * *